Figure 1:
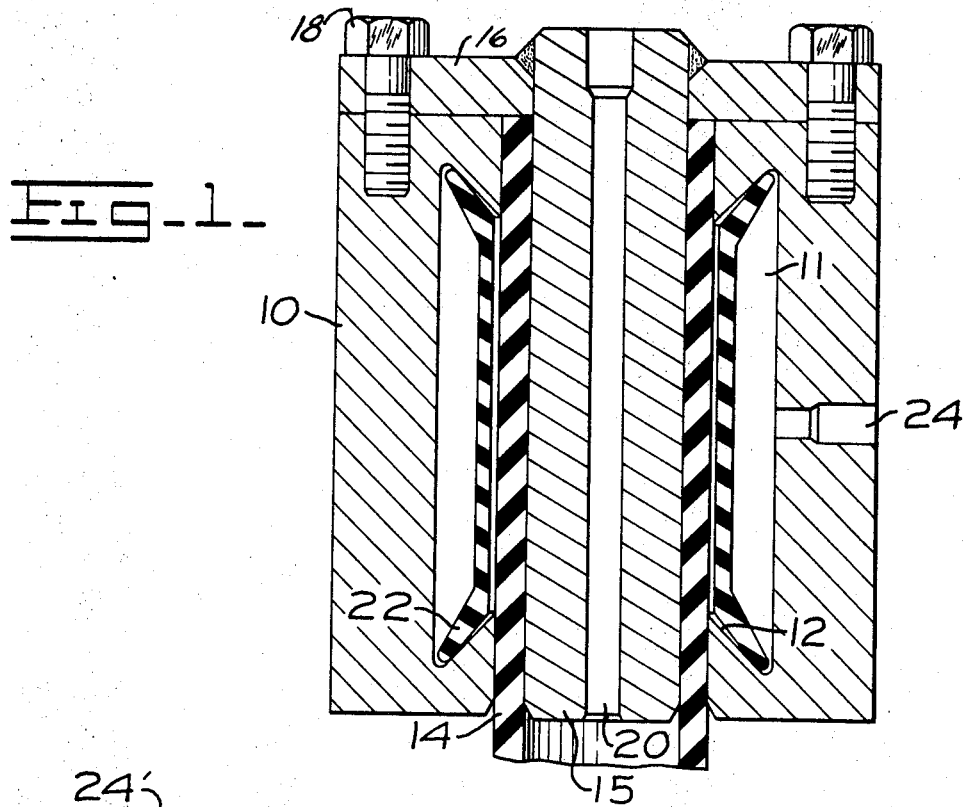

United States Patent

[11] 3,574,360

[72] Inventor Charles E. Grawey
 Peoria, Ill.
[21] Appl. No. 800,664
[22] Filed Feb. 19, 1969
[45] Patented Apr. 13, 1971
[73] Assignee Caterpillar Tractor Co.
 Peoria, Ill.

[54] FLUID-PRESSURE-TYPE HOSE CLAMP
 2 Claims, 2 Drawing Figs.
[52] U.S. Cl. ................................................ 285/96,
 277/34
[51] Int. Cl. ...................................................... F16l 17/00
[50] Field of Search .......................................... 285/96, 97,
 106, 107 (Cursory), 239; 138/(Inquired); 277/34;
 279/4, (1 Rub. Dig.); 269/22; 24/263.5 (A); 251/5;
 287/126, 109, 53; 73/49.1, 49.5, 49.8;
 166/(Inquired); 175/(Inquired); 192/88 (A)

[56] References Cited
 UNITED STATES PATENTS
 1,999,675 4/1935 White ............................. 192/88AX
 2,534,527 12/1950 Myers ............................. 279/4
 2,646,998 7/1953 Scheiwer ........................ 285/106
 2,837,121 6/1958 Roberts .......................... 285/239
 3,097,866 7/1963 Iversen ........................... 285/96X
 3,331,238 7/1967 Kost et al. ....................... 73/49.8
 FOREIGN PATENTS
 654,931 1/1963 Canada .......................... 285/96

Primary Examiner—David J. Williamowsky
Assistant Examiner—Wayne L. Shedd
Attorney—Fryer, Tjensvold, Feix, Phillips & Lempio ABSTRACT: A hose clamp particularly useful for testing purposes which forms a fluidtight connection with the end of a length of hose by the use of a flexible elastic sleeve brought into firm engagement with the surface of the hose by fluid under pressure, thus preventing damage to the hose.

PATENTED APR 13 1971

3,574,360

INVENTORS
CHARLES E. GRAWEY
BY
Fryer, Zimwald, Fix, Phillips & Lempio
ATTORNEYS

FLUID-PRESSURE-TYPE HOSE CLAMP

SUMMARY OF THE DISCLOSURE

It is customary in the manufacture of hose which is to be subjected to high pressure, such as the reinforced hose employed in high-pressure hydraulic systems, to conduct periodic tests of the hose being manufactured for various standards relating to contraction, elongation and burst pressure. For example, measurement of elongation of the hose under pressure is necessary to assure proper orientation of helically wound reinforcing wires in the hose which, if improperly oriented, can cause burst failure or blowing off of the hose coupling. Since very high pressures are encountered, couplings employed for testing must engage the hose very forcibly, and couplings heretofore used have caused deformation of the hose to the extent that it is not salable and it has been necessary to remove the end of the hose engaged by the coupling before the length which has been tested is commercially acceptable. This is uneconomical particularly where it is desired to run frequent tests because hose of this type is costly and the many short pieces which must be cut off and discarded represent a sizable economic waster.

The present invention solves the foregoing problem by embracing the hose with a coupling sleeve of flexible elastic material which is forced into intimate clamping contact with the hose by fluid pressure. The fluid is preferably hydraulic and the pressure may reach values in the order of a 8,500 p.s.i. enabling testing of the hose so clamped with pressures up to 5,000 p.s.i.

A more complete understanding of the invention will be gained upon reading the following specification wherein reference is made to the accompanying drawing.

Figure 2:
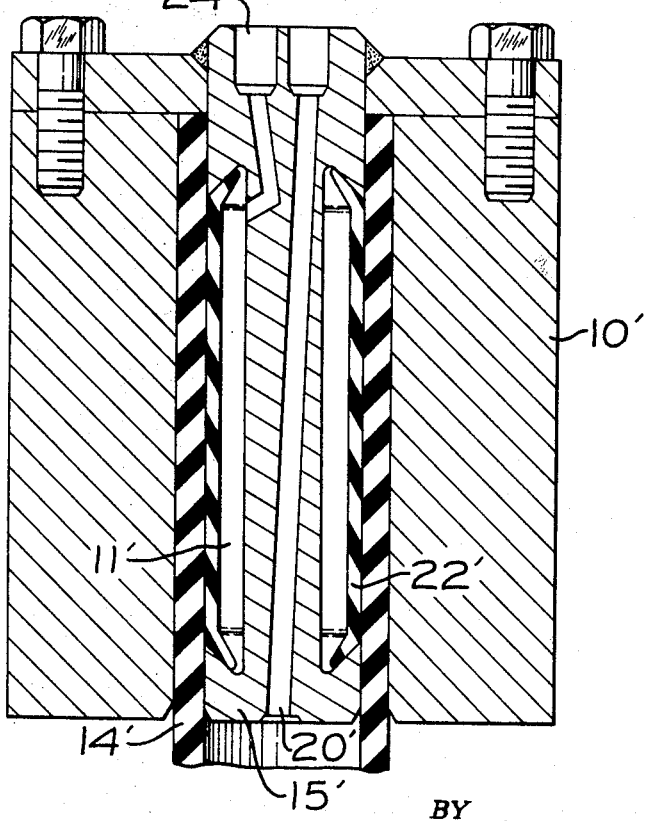

In the drawing:

FIG. 1 is a central sectional view through a hose clamp embodying the present invention showing one end of a length of hose to be tested disposed therein; and FIG. 2 is a similar view of a modified form of the invention wherein pressure is applied to the inner wall rather than the outer wall of the hose.

Referring first to FIG. 1, the coupling shown comprises a strong metal housing 10 with a central bore of a size to receive the end of a length of hose to be clamped and tested. The housing also has a counterbore to provide a cavity shown at 11 which has undercut ends to form frustoconical surfaces such as shown at 12. The hose which is illustrated at 14 fits sufficiently loosely to enable it to be easily inserted into the bore of the housing to the position shown. A central core 15 extends into the bore when the hose is disposed within the housing and is held in place by an end plate 16 and capscrews such as shown at 18. The central core has a bore 20 for the admission of testing fluid when the hose is properly clamped at both ends.

Clamping is accomplished by an elastomericlike sleeve 22 which fits within the counterbore of the housing 10 preferably with some clearance provided between the sleeve and the outside diameter of the hose as well as between the ends of the sleeve and the frustoconical ends of the counterbore. This clearance is obtained by forming the sleeve with cone angles slightly different from those in the counterbore so that the extreme ends of the sleeves will contact the counterbore. Fluid under pressure is introduced to the cavity 11 through an inlet 24 and causes contraction of the sleeve and gripping of the exterior of the hose with very high pressure which also causes some contraction of the hose until a very tight fit is accomplished between the interior of the hose and the core 15.

A modified form of the invention is shown in FIG. 2 where a housing 10' is shown as having a core 15' fitting within a hose 14' disposed within the housing. In this case, the core has a cavity 11' corresponding to the undercut cavity 11 of FIG. 1 and an elastomeric sleeve 22' fits within the core cavity as shown. In this view, the coupling is shown as pressurized as distinguished from FIG. 1 which shows the parts as they appear before pressure is introduced. In the modification of FIG. 2, pressure is introduced to the interior of the sleeve 22' through an inlet 24' and testing pressure is admitted to the hose through a suitable inlet and bore 20'.

Considering the modifications of FIGS. 1 and 2, the housing and core can be considered together as a housing which provides an annular recess into which the end of a hose can be inserted. Also in each case there is an annular chamber with a flexible sleeve contiguous to a part of a wall of the hose throughout its circumference so that fluid under pressure in the chamber imparts pressure to the hose and creates a seal between the inside and outside of the hose.

So far, the clamp has been described as for testing hose where the ends of the hose are in effect closed or blocked. However, the clamp could as well be used for clamping hose to equipment in a hydraulic system and fluid could flow through the bore 20 of FIG. 1 or 20' of FIG. 2, either of which could be made larger.

I claim:

1. A fluid-pressure-type hose clamp having a body with an annular recess into which the end of a length of hose may be inserted, said recess being formed by a body member having a bore, said bore having a sidewall, a core extending concentrically through the bore in spaced relationship thereto, a cavity being formed in said body member around the bore and opening circumferentially through the sidewall into the bore, said cavity being undercut at its ends so as to present frustoconical surfaces, an elastomeric sleeve defining two ends being located in the cavity, the ends of said elastomeric sleeve extending into the undercut areas and being in sealing contact with the frustoconical surfaces, said ends of said sleeve being of similar configuration to the frustoconical surfaces, the cavity and the sleeve forming a pressuretight chamber, and means to introduce fluid under pressure into the cavity behind the sleeve to urge the hose into fluidtight contact with said core.

2. A fluid-pressure-type hose clamp having a body with an annular recess into which the end of a length of hose may be inserted, said recess being formed by a body member having a bore, a core extending concentrically through the bore in spaced relationship thereto, said cavity being formed in the wall of the core, said cavity being coextensive with the circumference of the core, an elastomeric sleeve defining two ends being located in the cavity, said cavity being undercut at its ends so as to present frustoconical surfaces, the ends of said elastomeric sleeve extending into the undercut areas and being in contact with the frustoconical surfaces, said ends of said sleeve being of similar configuration to the frustoconical surfaces, the cavity and the sleeve forming a pressuretight chamber, and means to introduce fluid under pressure into the cavity behind the sleeve to urge the hose into fluidtight contact with said bore.

PO-1050
(5/69)

UNITED STATES PATENT OFFICE
CERTIFICATE OF CORRECTION

Patent No. 3,574,360     Dated April 13, 1971

Inventor(s) CHARLES E. GRAWEY

It is certified that error appears in the above-identified patent and that said Letters Patent are hereby corrected as shown below:

Column 2, line 58, --sealing-- should be inserted before "contact".

Signed and sealed this 19th day of October 1971.

(SEAL)
Attest:

EDWARD M. FLETCHER, JR.
Attesting Officer

ROBERT GOTTSCHALK
Acting Commissioner of Patents